UNITED STATES PATENT OFFICE.

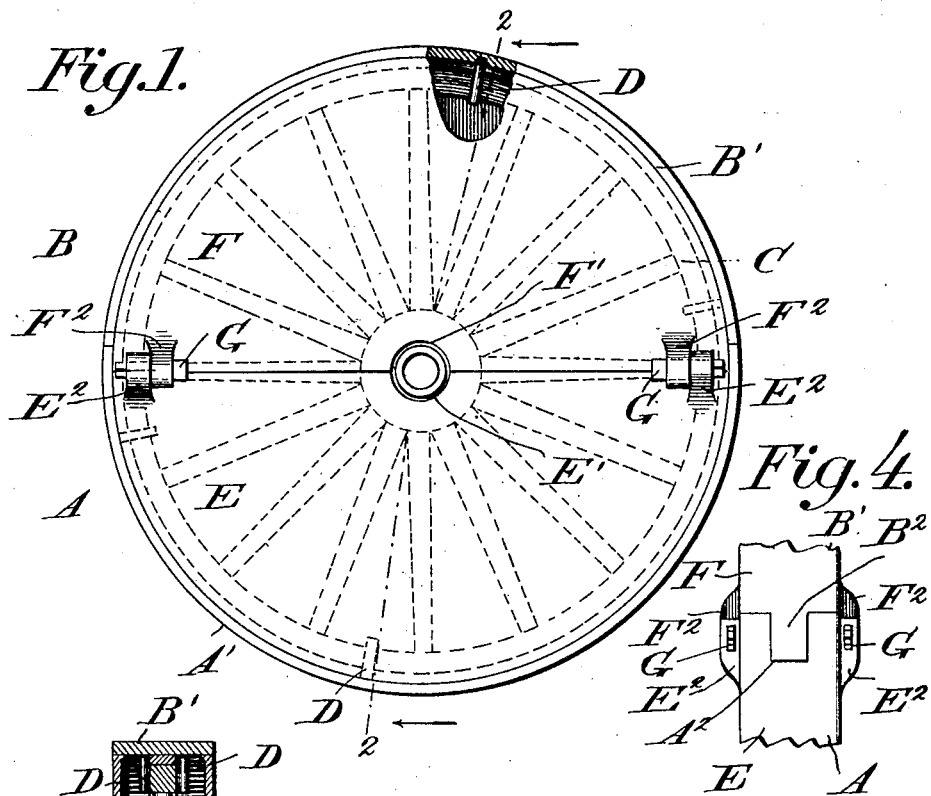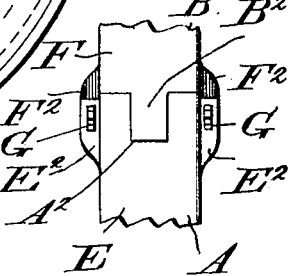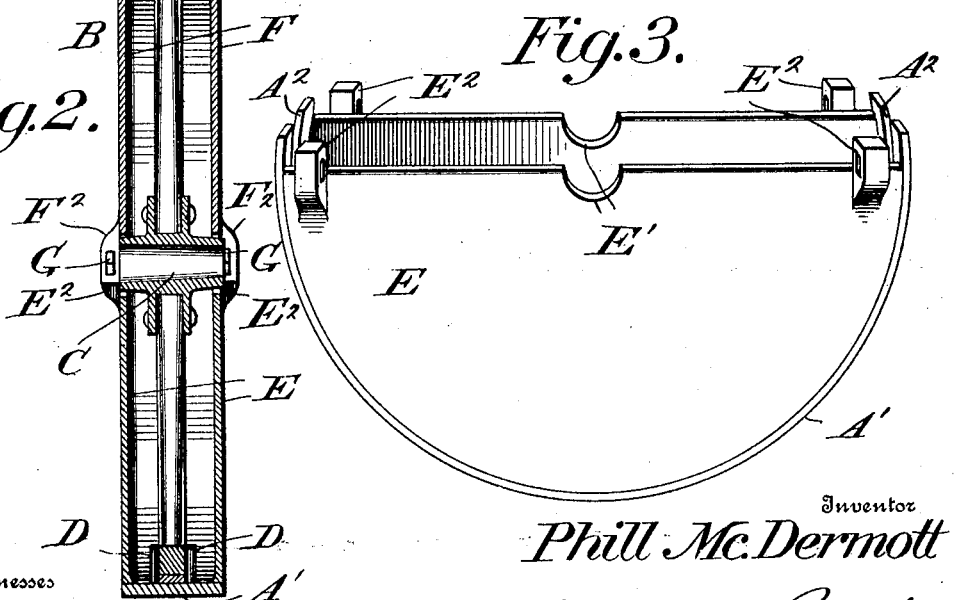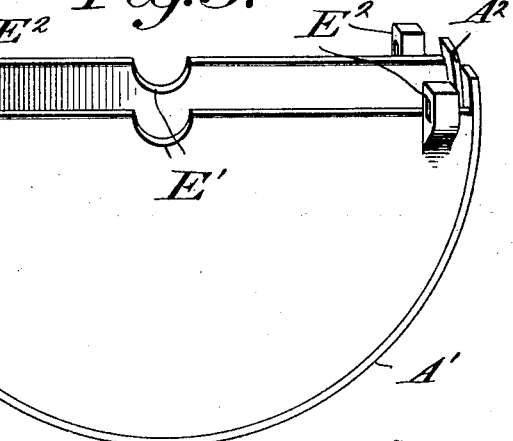

PHILL McDERMOTT, OF DERMOTT, ARKANSAS.

DETACHABLE TIRE.

No. 887,341.  Specification of Letters Patent.  Patented May 12, 1908.

Application filed March 9, 1907. Serial No. 361,551.

*To all whom it may concern:*

Be it known that I, PHILL McDERMOTT, a citizen of the United States, residing at Dermott, in the county of Chicot and State of Arkansas, have invented a new and useful Improvement in a Detachable Tire, of which the following is a specification.

This invention relates to tires and more particularly to detachable tires, the object being to provide a tire which can be easily and quickly placed on an ordinary wheel so as to widen the tire and prevent the wheel from sinking into muddy roads in wet weather.

Another object of my invention is to provide the tire with sides, so that the wheel will be entirely inclosed, so as to prevent the mud from getting in between the spokes and clogging the same.

The invention consists of the novel features of construction hereinafter fully described, pointed out in the claims and shown in the accompanying drawings, in which, Figure 1 is a side elevational view of my improved tire showing it secured on a wheel. Fig. 2 is a section taken on lines 2—2 of Fig. 1. Fig. 3 is a perspective view of one of the sections of the tire. Fig. 4 is a detail view of the meeting ends of the tire section showing the manner of securing the two together.

In the drawing A and B represent a pair of tire sections adapted to be secured over an ordinary wheel C.

The sections A and B are formed of semi-circular tires A' and B' of a width greater than the width of the ordinary tire used on wheels. The ends of the tire A' are provided with the notches $A^2$ to receive the tongues $B^2$ projecting out from the ends of the tire B' so as to form an even joint when united. Spaced pins D are adapted to be received in the tires A', B' on each side of the tire of the wheel C and securely hold the wheel in the center of the tire.

Secured in the tires A', B' adjacent to their edges are semi-circular plates E, F forming sides which are provided with central notches E', F' in the free edges in which the hub of the wheel is adapted to fit. The sides are provided with slotted lugs $E^2$, $F^2$ adjacent to the ends of the tire, which are so arranged with respect to each other that when the sections are brought together the lugs $F^2$ will come on the inside of the lugs $E^2$ so as to bring the slots of the lugs in alinement with each other. Split wedges G, are adapted to be driven through the slots of the lugs and securely lock the sections on the wheel.

From the foregoing description it will be readily seen that I have provided a novel tire which can be easily and quickly placed on a wheel or taken off and one which will prevent the wheel from becoming clogged with mud.

Having thus fully described my invention, what I claim as new and desire to secure by Letters Patent, is:—

1. A detachable tire comprising a pair of semi-circular tires, the ends of one tire being notched to receive the tongues formed on the ends of the other tire and sides carried by the tire provided with means for securing said sides together.

2. A detachable tire comprising sections, with interlocking ends provided with sides, slotted lugs formed on said sides, and wedges adapted to fit in said lugs and secure the sections together.

3. A detachable tire comprising a pair of semi-circular tires adapted to be interlocked together, spaced pins secured in said tires, semi-circular plates secured in said tires adjacent to the edges provided with notches, slotted lugs secured to said sides and wedges adapted to pass through the slots in said lugs and secure said sides together.

PHILL McDERMOTT.

Witnesses:
 D. KIMPEL,
 J. H. OWENS.